UNITED STATES PATENT OFFICE.

HEINRICH CARO, OF MANNHEIM, BADEN, GERMANY, ASSIGNOR TO BADISCHE ANILIN AND SODA FABRIK, OF SAME PLACE.

SULPHONATED COMPOUND OF ROSANILINE.

SPECIFICATION forming part of Letters Patent No. 250,201, dated November 29, 1881.

Application filed March 28, 1878. Patented in England October 8, 1877, in Germany December 16, 1877, and in France February 19, 1878.

*To all whom it may concern:*

Be it known that I, HEINRICH CARO, a citizen of the German Empire, residing at Mannheim, in the Grand Duchy of Baden, German Empire, have invented a new and useful Improvement in Dye-Stuffs or Coloring-Matters, (for which I have received Letters Patent in England, No. 3,731, dated October 8, 1877, in Germany, No. 2,096, dated December 16, 1877, and in France, No. 122,721, dated February 19, 1878,) of which the following is a specification.

This invention relates to a dye-stuff or red coloring-matter, which is obtained by acting upon fuchsine with crystallizable sulphuric acid, commonly called "anhydrous sulphuric acid," by which is formed a tri-sulpho compound of rosaniline. The dye-stuff called "fuchsine" is also known under the names of "roseine," "magenta," and "ruby."

In carrying out my invention I take ten kilograms of fuchsine, which has been dried at 110° centigrade, and add thereto, little by little, forty kilograms of crystallizable sulphuric acid, commonly called "anhydrous sulphuric acid," under constant agitation, while the temperature of the mixture must not be allowed to sink below 120° centigrade, nor to rise above 170° centigrade. A sample of the mass is supersaturated from time to time with an alkali, such as soda-lye, and if a clear yellowish solution is produced without a precipitate, the conversion is completed. The thick fluid mass which is obtained by this conversion is easily soluble in water, and after it has been dissolved it is treated with milk of lime. The lime-salt of the new coloring-matter which is obtained by this process, and which is easily soluble in water, is separated by filtration from the gypsum, and by treating the solution of the lime-salt with a solution of soda said lime-salt is transformed into the corresponding soda-salt, which latter is reduced to a dry state by evaporation. This salt, however, is very deliquescent, and in order to render it convenient for commercial purposes I prefer to transform the same into an acid salt of soda, which, when dried, has a metallic-green appearance. For this purpose I add to the solution of the salt of soda a sufficient quantity of muriatic acid until the mixture assumes a deep-red color, and then I dry the product by evaporation.

The characteristics of the new dye-stuff or coloring-matter prepared from fuchsine in the manner above described, are as follows: First, by a surplus of alkali its aqueous solution is changed from a fuchsine-red to a light yellow; second, the dyeing on wool is done in a boiling dye-bath with the addition of mineral acids or with acid mordants, such as are commonly used in dyeing or printing; third, it produces on wool nearly the same shades of color which are produced with ordinary fuchsine, from which it is derived; fourth, the color obtained on wool is only changed with great difficulty by strong acids; fifth, this product is the compound whose name in strict chemical language is "tri-sulpho acid of rosaniline."

What I claim as new, and desire to secure by Letters Patent, is—

1. As a new article of manufacture, the dye-stuff or red coloring-matter having the characteristics above set forth.

2. The within-described process for producing a new dye-stuff or red coloring-matter by the action of crystallizable sulphuric acid, commonly called "anhydrous sulphuric acid" or "fuchsine," substantially in the manner set forth.

In testimony that I claim the foregoing I have hereunto set my hand and seal this 22d day of February, 1878.

HEINRICH CARO. [L. S.]

Witnesses:
   WM. PICKHARDT,
   C. GLASER.